United States Patent
Cohen et al.

(10) Patent No.: US 8,144,713 B2
(45) Date of Patent: Mar. 27, 2012

(54) TELECOMMUNICATIONS SYSTEM

(75) Inventors: Robert David Cohen, Edgeware (GB); Peter George Farrimond, Harpenden (GB); Nicholas Peter Kramer, Ponoma, NY (US); James Peter Patterson, Eleebana (AU); Mark John Swarbrick, London (GB); Harjot Singh Saberwal, Wembley (GB)

(73) Assignee: British Telecommunications public limited company, London (GB)

( * ) Notice: Subject to any disclaimer, the term of this patent is extended or adjusted under 35 U.S.C. 154(b) by 12 days.

(21) Appl. No.: 12/514,545

(22) PCT Filed: Oct. 5, 2007

(86) PCT No.: PCT/GB2007/003773
§ 371 (c)(1),
(2), (4) Date: Mar. 12, 2010

(87) PCT Pub. No.: WO2008/059195
PCT Pub. Date: May 22, 2008

(65) Prior Publication Data
US 2010/0195658 A1 Aug. 5, 2010

Related U.S. Application Data

(63) Continuation of application No. 11/598,230, filed on Nov. 13, 2006.

(51) Int. Cl.
*H04L 12/28* (2006.01)
*H04L 12/56* (2006.01)

(52) U.S. Cl. ......... 370/395.41; 370/395.42; 370/395.43

(58) Field of Classification Search .......... 370/352–357, 370/401, 395.41, 395.42, 395.43; 709/230
See application file for complete search history.

(56) References Cited

U.S. PATENT DOCUMENTS

| 5,305,389 A | 4/1994 | Palmer |
| 6,058,102 A | 5/2000 | Drysdale et al. |
| 6,181,679 B1 | 1/2001 | Ashton et al. |

(Continued)

FOREIGN PATENT DOCUMENTS

DE 102 28 597 A1 6/2003

(Continued)

OTHER PUBLICATIONS

Individual Submission Lennox/Schulzrinne Columbia University: "Transporting User Control Information in SIP Register Payloads; draft-lennox-sip-reg-payload-01.txt;" IETF Standard-Working-Draft, Internet Engineering Task Fore IEFT, CH, No. 1 (Oct. 31, 2000).

(Continued)

*Primary Examiner* — Chuong T Ho
(74) *Attorney, Agent, or Firm* — Nixon & Vanderhye P.C.

(57) ABSTRACT

Virtual dedicated voice connections between parties to a packet-switched system can be created by reserving capacity for such connections in the packet-switched system. The capacity reservable by any one party is limited to prevent over-subscription of resources in the packet switched. The system incorporates a call admission control processor for controlling access to the packet-switched call routing system such that a voice call attempt is successful only if capacity for such a dedicated connection has previously been reserved. The capacity reserved for the virtual connections is made available for use by other traffic when not required for voice sessions.

14 Claims, 5 Drawing Sheets

U.S. PATENT DOCUMENTS

| | | | |
|---|---|---|---|
| 6,560,236 B1 | 5/2003 | Varghese et al. | |
| 6,681,232 B1 | 1/2004 | Sistanizadeh et al. | |
| 6,778,531 B1 | 8/2004 | Kodialam et al. | |
| 6,977,930 B1 | 12/2005 | Epps et al. | |
| 7,127,422 B1 | 10/2006 | Bundy | |
| 7,142,512 B1 | 11/2006 | Kobayashi et al. | |
| 7,324,551 B1 | 1/2008 | Stammers | |
| 7,388,834 B2 | 6/2008 | Naik et al. | |
| 7,426,209 B2 | 9/2008 | Ayres | |
| 7,444,415 B1 | 10/2008 | Bazzinotti et al. | |
| 2002/0097675 A1 | 7/2002 | Fowler et al. | |
| 2002/0105911 A1 | 8/2002 | Pruthi et al. | |
| 2002/0186899 A1 | 12/2002 | Bohnenkamp | |
| 2003/0053420 A1 | 3/2003 | Duckett et al. | |
| 2003/0079121 A1 | 4/2003 | Gilman et al. | |
| 2003/0149787 A1 | 8/2003 | Mangan | |
| 2003/0235187 A1* | 12/2003 | Iwama et al. | 370/352 |
| 2004/0024550 A1 | 2/2004 | Doerken et al. | |
| 2004/0047289 A1 | 3/2004 | Azami | |
| 2004/0073690 A1* | 4/2004 | Hepworth et al. | 709/230 |
| 2005/0120138 A1 | 6/2005 | Carmello et al. | |
| 2005/0128946 A1 | 6/2005 | Murakami et al. | |
| 2005/0169190 A1 | 8/2005 | Mathieu et al. | |
| 2005/0169270 A1 | 8/2005 | Mutou et al. | |
| 2006/0007917 A1 | 1/2006 | Saito et al. | |
| 2006/0088031 A1 | 4/2006 | Nalawade | |
| 2006/0176824 A1 | 8/2006 | Laver et al. | |
| 2006/0206600 A1 | 9/2006 | Wong | |
| 2006/0209829 A1 | 9/2006 | Lo et al. | |
| 2006/0215564 A1 | 9/2006 | Breitgand et al. | |
| 2007/0041329 A1 | 2/2007 | Schine | |
| 2007/0140140 A1 | 6/2007 | Feeley et al. | |
| 2007/0189187 A1 | 8/2007 | Ryu et al. | |
| 2007/0214157 A1 | 9/2007 | Kegeli | |
| 2007/0263613 A1* | 11/2007 | Hara et al. | 370/356 |
| 2007/0280289 A1* | 12/2007 | Konda | 370/468 |
| 2008/0019362 A1 | 1/2008 | Wainwright | |
| 2008/0019382 A1 | 1/2008 | Wainwright | |
| 2008/0019383 A1 | 1/2008 | Wainwright | |
| 2008/0019384 A1 | 1/2008 | Wainwright | |
| 2008/0031148 A1 | 2/2008 | Sagy | |
| 2008/0069334 A1 | 3/2008 | Denby et al. | |
| 2008/0112399 A1 | 5/2008 | Cohen | |
| 2008/0186854 A1 | 8/2008 | Farrimond | |
| 2008/0188191 A1 | 8/2008 | Farrimond | |
| 2010/0195658 A1 | 8/2010 | Cohen et al. | |

FOREIGN PATENT DOCUMENTS

| | | |
|---|---|---|
| DE | 10228597 A1 | 6/2003 |
| EP | 0716525 A2 | 6/1996 |
| EP | 0948165 A1 | 10/1999 |
| EP | 1549005 A | 6/2005 |
| WO | WO 96/00946 | 1/1996 |
| WO | WO 97/45801 | 12/1997 |
| WO | WO 00/57276 | 9/2000 |
| WO | WO 02/32097 A | 4/2002 |
| WO | WO 2004/025508 | 3/2004 |
| WO | WO 2005/093603 A1 | 10/2005 |

OTHER PUBLICATIONS

McDysan, "QoS & Traffic Management in IP & ATM Networks," McGraw-Hill, USA (2000).
International Search Report for PCT/GB2007/003773, mailed Feb. 26, 2008.
Office Action dated Dec. 23, 2008 in U.S. Appl. No. 11/489,719.
Office Action dated Dec. 12, 2008 in U.S. Appl. No. 11/489,718.
Office Action dated Dec. 12, 2008 in U.S. Appl. No. 11/594,973.
Office Action dated Feb. 23, 2009 in U.S. Appl. No. 11/594,972.
Office Action dated Jun. 11, 2009 in U.S. Appl. No. 11/702,669.
Office Action dated Jul. 6, 2009 in U.S. Appl. No. 11/702,665.
Office Action dated Jan. 5, 2010 in U.S. Appl. No. 11/702,669.
Office Action dated Jan. 14, 2010 in U.S. Appl. No. 11/702,665.
European Search Report dated Jan. 10, 2007, RS 114465.
European Search Report No. RS115250GB completed Jun. 7, 2007.
European Search Report No. RS115251GB completed Jun. 7, 2007.
European Search Report of Aug. 17, 2007 RS 115252.
International Search Report of Jul. 6, 2005 in International Application No. PCT/GB2005/001051.
International Search Report and Written Opinion of the International Searching Authority mailed Feb. 26, 2008 in PCT/GB2007/003773.
Bhattacharyya et al., "RFC 3569: An Overview of Source-Specific Multicast (SSM)", Internet Engineering Task Force, Jul. 2003, XP015009351.
Chidlovskii et al., "Semantic Cache Mechanism for Heterogeneous Web Querying," Computer Networks, vol. No. 11-16, May 1999, pp. 1347-1360.
Clark, M. et al., "Application-Level Measurements of Performance on the vBNS," Multimedia Computing and Systems, 1999, IEEE International Conference on Florence, Italy Jun. 7-11, 1999, Los Alamitos, CA, USA, IEEE Comput. Soc., U.S., vol. 2, Jun. 7, 1999, pp. 362-366, XP010519415.
Harder et al., "Datenbanksysteme. Konzepte and Techniken der Implementierung," 1999, pp. 121-122 and 151-152.
Holbrook et al., "Using IGMPv3 and MLDv2 for Source-Specific Multicast (draft-holbrook-idmr-igmpv3-ssm-08.txt", Internet Engineering Task Force, Oct. 1, 2004, XP015014473.
Individual Submission Lennox/Schulzrinne Columbia University: "Transporting User Control Information in SIP Register Payloads; draft-lennox-sip-reg-payload-01.txt," IETF Standard-Working-Draft, Internet Engineering Task Force, IETF, Ch, No. 1, Oct. 31, 2000, XP015031574, ISSN: 0000-0004.
Jiang, Y., et al., "Providing Quality of Service Monitoring: Challenges and Approaches," IEEE, Apr. 10, 2000, pp. 115-128, XP010376678.
Lamb, C., et al., "The ObjectStore database system," Communications of the ACM, 34(10 :50-63, Oct. 1991.
McDysan, D., "QoS & Traffic Management in IP & ATM Networks", 2000, McGraw-Hill, US, XP002442599.
Mostefaoui et al., "Multimedia Prefetching Strategy for News-On-Demand Applications," Database and Expert Systems Applications, 1999, pp. 1-5.
Park, K., et al., "On the Effectiveness of Route-Based Packet Filtering for Distributed DOS Attack Prevention in Power—Law Internets," Computer Communication Review, ACM, New York, NY, vol. 31, No. 4, Oct. 2001, pp. 15-26, XP001115743, ISSN: 0146-4833, p. 16, left-hand column, line 1—line 20.
Rosen Y. Rekhter Cisco Systems, et al., "BGP/MPLS VPNs" IETF Standard, Internet Engineering Task Force, IETF, Ch Mar. 1999 (XP015008330 ISSN: 0000-0003.
Signer, Beat, et al., "A Personal Assistant for Web Database Caching," in the proceedings of the Conference on Advanced Information Systems Engineering (2000.
Xu et al., "Towards Semantics-Based Prefetching to Reduce Web Access Latency," Proceedings of the 2003 Symposium on Applications and the Internet (SAINT'03, Jan. 2003, 8 pages.
Office Action (14 pgs.) dated Jul. 21, 2011 issued in co-pending U.S. Appl. No. 11/598,230.
U.S. Appl. No. 10/593,585, filed Sep. 21, 2006.
Office Action (pgs. 1-4) dated Aug. 8, 2011 issued in EP Application No. 07 824 029.8.

\* cited by examiner

TELECOMMUNICATIONS SYSTEM

CROSS-REFERENCE TO RELATED APPLICATIONS

This application is the U.S. national phase of International Application No. PCT/GB2007/003773 filed Oct. 5, 2007, which designates the U.S., and is also a continuation-in-part of U.S. Ser. No. 11/598,230 filed Nov. 13, 2006, the entire contents of both of which are hereby incorporated by reference.

This application is related to the following commonly assigned, copending applications:

U.S. patent application Ser. No. 11/489,718 filed Jul. 20, 2006;
U.S. patent application Ser. No. 11/489,719 filed Jul. 20, 2006;
U.S. patent application Ser. No. 11/594,972 filed Nov. 9, 2006;
U.S. patent application Ser. No. 11/594,973 filed Nov. 9, 2006;
U.S. patent application Ser. No. 11/598,230 filed Nov. 13, 2006;
U.S. patent application Ser. No. 11/702,665 filed Feb. 6, 2007; and
U.S. patent application Ser. No. 11/702,669 filed Feb. 6, 2007.

BACKGROUND

1. Technical Field

This invention relates to telecommunications systems, and in particular to the provision of dedicated connections between defined points.

Modern telecommunications systems allow almost any telecommunications device to be connected to any other using conventional switched networks (circuit switched or packet switched).

2. Related Art

Early attempts to integrate voice and data systems relied on carrying digital data over a circuit-switched system initially designed for analogue signals, in particular voice. Conversely, modern packet-switched telecommunications systems, such as those running under the "Internet Protocol", are configured for digital data, and analogue data, notably voice, has to be adapted to fit the protocol. Voice, in particular, has rather different requirements from those of data. Small values of latency (delay) are much more significant to a human listener than they are to a machine processing incoming data. Jitter—the variability of the delay—is even more significant. Conversely, the amount of redundancy in human speech is such that a human listener can still comprehend a voice signal that has suffered impairment to a much greater degree than would be acceptable in a data signal.

Existing "Voice over Internet Protocol" systems have procedures in place to reflect these different priorities, but call quality can still fall below that expected on a switched circuit, in particular because in a packet-switched system, unlike a conventional circuit-switched call, resources are shared and the underlying connection requirements are "best effort". Contention for resources, for example between a number of simultaneous voice calls, can result in insufficient bandwidth being available to support the call traffic required. In comparison, provided a line is available, a circuit-switched system dedicates capacity dedicated solely to a single connection for the duration it is required.

The problems of latency and of contention with other subscribers for bandwidth, mean that dedicated point-to-point links are still preferred for certain applications. Such dedicated point-to-point physical circuits are expensive to provide as they require dedicated infrastructure to be installed over the entire length of the link, and there are few synergies available to reduce the cost of installing several such links. They are also less robust to system failure, and replacement or diversion (whether in an emergency or otherwise) requires major re-installation work.

The present invention addresses these issues by providing a method of creating virtual dedicated connections between parties to a packet switched system by populating a session parameter database with parameters for permitted sessions, and controlling access to a packet switched call routing system such that, when a session request is set up between a first party and a second party, the session is connected only if specified parameters of the requested session, including the identities of the first party and the second party, have previously been stored in the session parameter database.

BRIEF SUMMARY

The packet-switched system preferably operates under the "Internet Protocol" and is either a private or limited-user system: such systems are known as Intranets and Extranets respectively. They have many of the characteristics of the public "Internet", and indeed usually interface with it, but they make use of dedicated resources and normally have access controls such as "firewall" systems to prevent unauthorised access.

Unlike a physical leased line, the capacity on the virtual connections may be made available for use by general traffic when not required for sessions meeting the parameter set. Such use may be subject to limitations, for example on bandwidth, protocols etc. For example it may be limited to non-voice traffic. Moreover, as the virtual dedicated connection is carried over a packet switched system, it is easy to reconfigure should it become necessary, for example because of relocation of either party to the connection, or of any intermediate part of the link.

One aspect of the present invention provides call control means for a packet-switching system, comprising a session parameter database, a data entry portal for populating the session parameter database with permitted session parameters, including the identifies of permitted combinations of calling party and called party, and a session admission control process for processing session requests received from calling parties, the session admission control processor comprising means for receiving a request for a first party to set up a session to a second party, data retrieval means for cooperating with the session parameter database to identify whether parameters corresponding to the session request have been stored in the session parameter database, and session connection means for completing the connection if the specified parameters of the requested session have previously been stored in the session parameter database.

By establishing in advance the parameters which characterise connections that may be authorised, over-subscription can be avoided. Users may establish more than one session at once, provided that the parameters for each individual session have all been authorised.

The capacity reservable by any one party may be limited to prevent over-subscription of the resources in the routing system. To ensure capacity is not reserved unnecessarily, establishment of an authorised session may require the cooperation of both parties.

The amount of bandwidth (capacity) reserved for an individual connection may be selected depending on factors such as the quality of the link required, and the speed or other characteristics of the users' terminal equipment, and other parameters such as the coding process to be used in the sessions.

A connection may be to a dynamic location—for example connection may be made to a user's fixed or mobile terminal depending on factors such as time of day of the user's forwarding settings.

BRIEF DESCRIPTION OF THE DRAWINGS

An embodiment of the invention will now be described by way of example only, with reference to the drawings, in which.

DETAILED DESCRIPTION OF EXEMPLARY EMBODIMENTS

Figure 1:
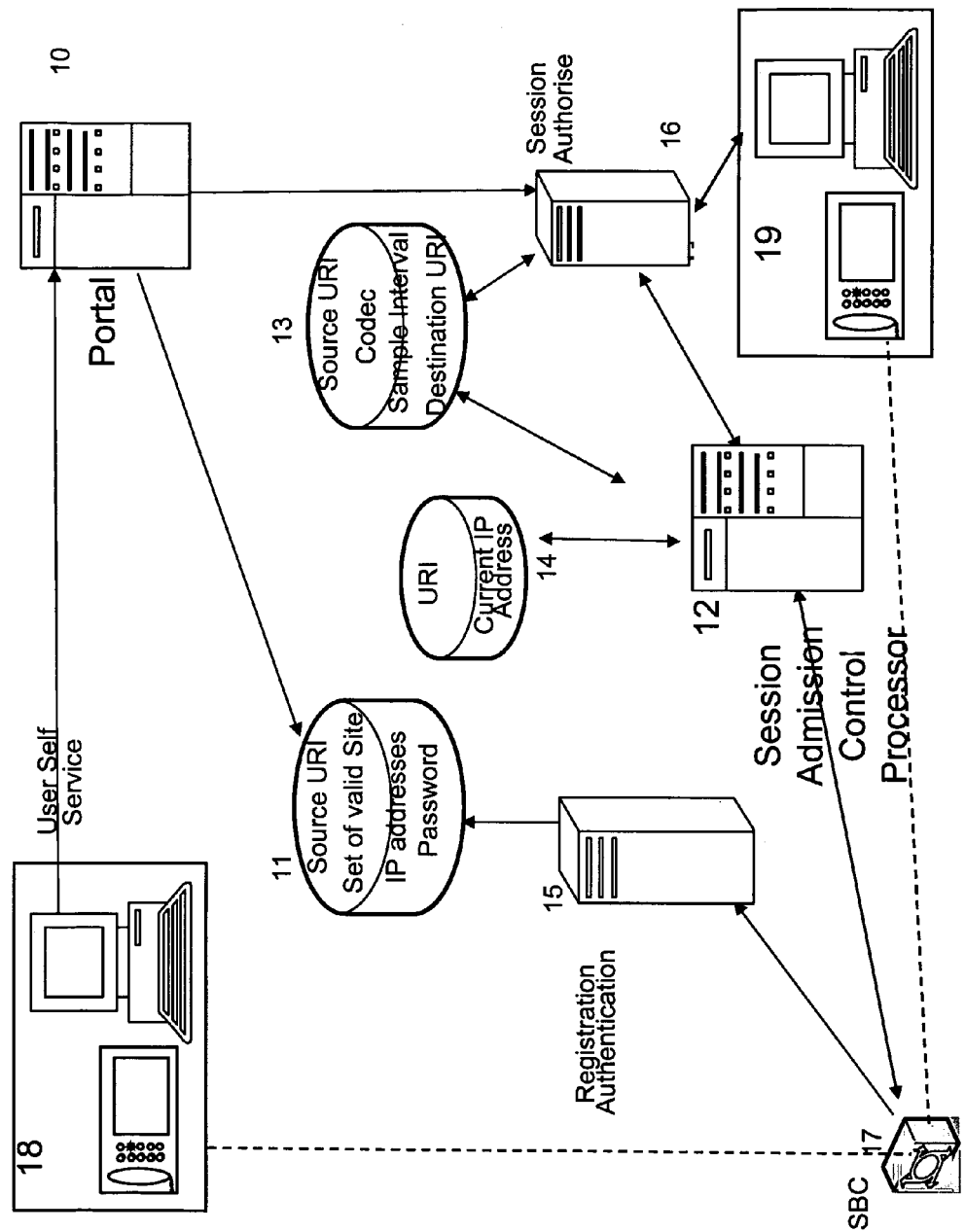
FIG. 1 is a schematic illustration of an installation including a call admission control layer according to the invention.

Referring to FIG. 1, the system illustrated comprises a registration processor 15 and a session authorisation processor 16. The registration processor 15 controls access to the system, and the session authorisation processor 16 controls the reservation of capacity. Access to the system for reservation purposes is made by a user terminal 18, 19 through a user portal 10, whilst sessions are set up through a session border controller 17. (For brevity, the users will be referred to by the same reference numerals as the respective terminals 18, 19 they are using).

Figure 3:
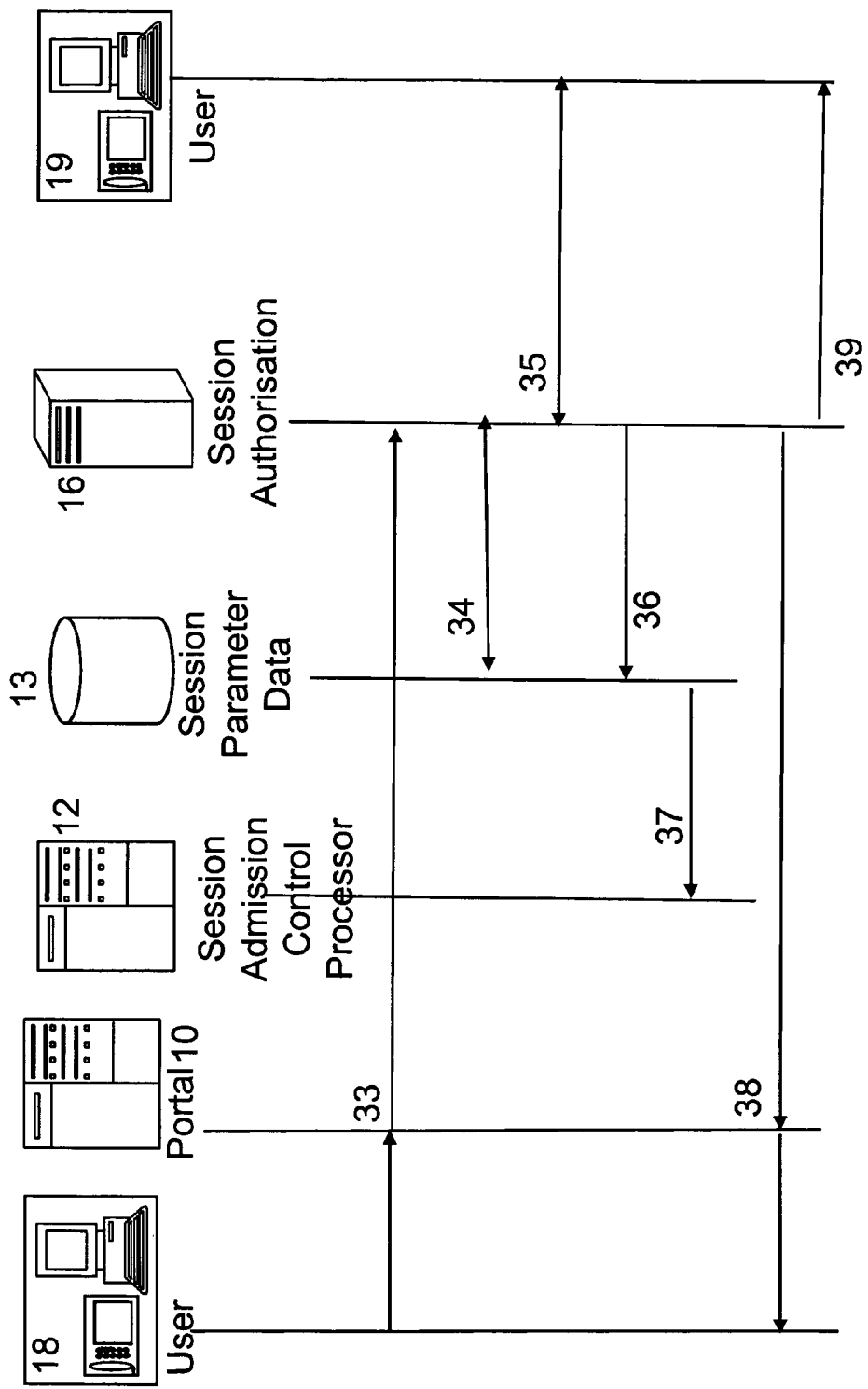
FIG. 3 is a flow diagram illustrating the process by which capacity may be reserved.

The capacity reservation process will now be discussed, with reference to FIG. 3. A session parameter database 13 maintains the details of all the permitted reserved-capacity sessions. It also stores details of the source and destination URIs (universal resource indicator) for each end of the established sessions, together with the sample interval and codecs used. These latter factors determine the capacity (bandwidth) required to maintain a speech-quality link. When a user first subscribes to the system a specified amount of bandwidth is configured (several hundred kilobits/sec), which can be broken down into call slot reservations.

Once a user is identified to the system, he may request a virtual reserved-capacity session with another party 19. The user 18 identifies the other party using a directory facility, for example by email address. This identity is sent by way of the portal 10 to the session authorisation processor 16 (step 33) which checks with the session parameter database 13 whether there remains sufficient unallocated capacity to make the new allocation (step 34). It should be noted that the assessment is based on the capacity not already allocated to virtual links, and not on the capacity allocated to such links but not currently in use.

If sufficient capacity is available—that is to say, sufficient capacity from the user's allocation remains available, a message is sent to the other party 19 (step 35) to request authorisation of this capacity for the new virtual link. The other party may accept such a link, in which case it will be added to the session parameter database 13 (step 36). The other party may, instead, decline. This may be done if, for instance, the other party has a large number of such connections established already, leaving insufficient remaining capacity for the newly-requested link without deleting some other reserved link.

If the link is accepted, network capacity is reserved in the session parameter database 13 for "Voice over Internet Protocol" (VoIP) sessions between these two parties 18, 19. The data is made accessible to a session admission control processor 12 (step 37) so that connections can be made using the reserved capacity, and confirmation sent to both users 18, 19 (steps 38, 39). As this is a virtual connection over a packet switched network, when no such call is in progress the reserved capacity is available for other purposes, such as carrying less time-critical non-voice traffic. The speed with which such traffic can be carried will depend on how much of the capacity reserved for voice links is actually required at any given moment.

Figure 2:
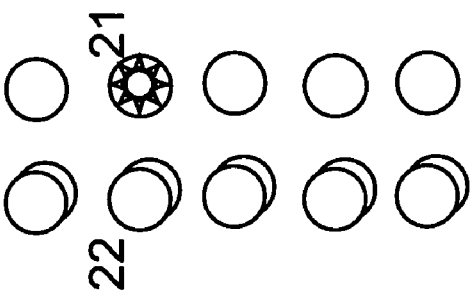
FIG. 2 is a schematic illustration of a user terminal configured to be used with the invention.

When capacity is reserved for a dedicated virtual link, a representation of the new link's availability is generated for display on both users' user displays. In response to the notifications 38, 39. Each user's terminal 18, 19 is configured to facilitate connection to the other's URI. As shown in FIG. 2, this can be done by allocating a button 22 on the control panel of a user device, and an associated indicator light 21, to the new link. Alternative user interfaces may be used, for example an icon or a pop-up on a computer screen, which can be activated by moving a cursor over it using an user input device such as a computer mouse. As another example, a standard Internet Protocol telephone may be used, one of the "soft keys" and the associated display being configured appropriately.

The user terminals are therefore configured to allow a user to readily establish sessions with one or more of the parties with whom capacity has previously been reserved.

Figure 4:
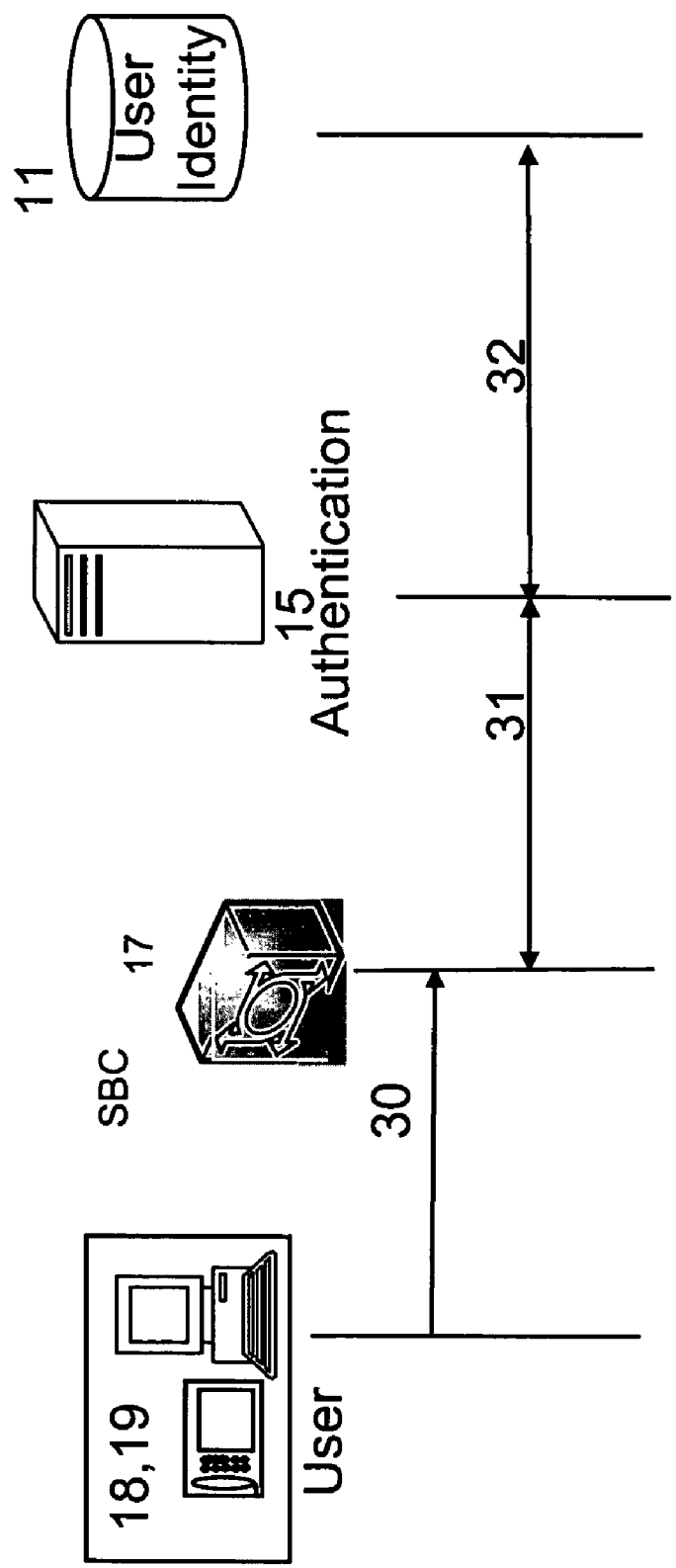
FIG. 4 is a flow diagram illustrating the process by which a user may register with the system.

Registration with the system will now be discussed, with reference to FIG. 4. When a user connects to the system he accesses the SBC 17 through his terminal 18, 19 (step 30). The SBC 10 first corresponds with the authentication processor 15 (step 31) which checks the user name against a set of valid site IP addresses stored in the user identity store 11 for that user (step 32), and if the user is registering from a valid address, it then performs a password check. This ensures that any user attempting to use the system is indeed the user that he claims to be, and allows the SBC 10 to identify location information, specifically the IP address, currently associated with that user.

Figure 5:
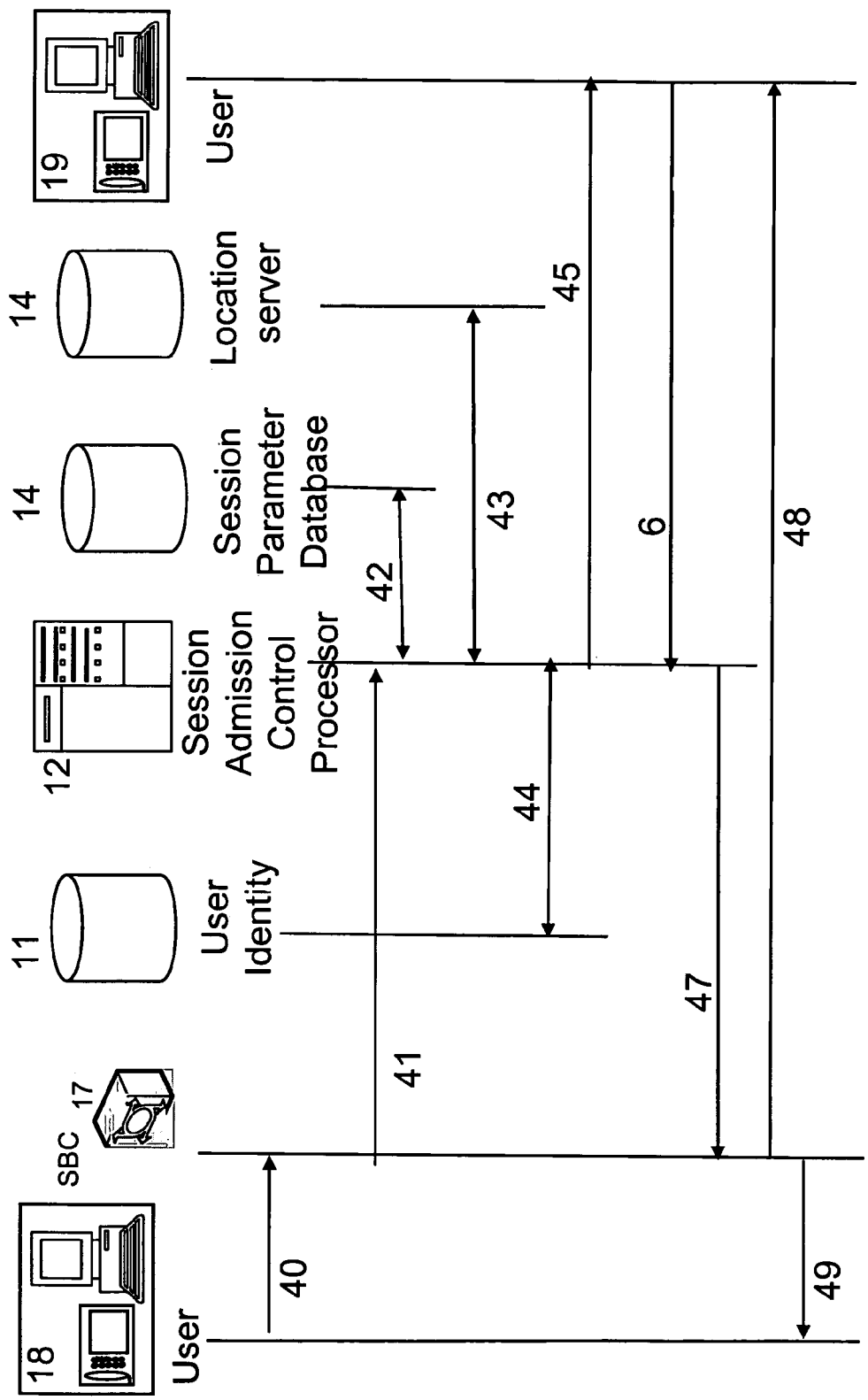
FIG. 5 is a flow diagram illustrating the process by which reserved capacity may be used to connect a voice call.

As shown in FIG. 5, when a user 18, having registered with the system, wishes to establish a voice connection with a party 19 for which a dedicated link has previously been reserved, he operates the control 22 representing the called party, which causes the user terminal 18 to transmit a request 40 to the session border controller (SBC) 17 for a link to be set up to the terminal 19 currently associated with the URI specified in the request. The SBC 17 cooperates with the session admission control processor 12 (step 41) to establish this link. The session admission control processor 12 first checks that the parameters of the requested session match parameters in the session parameter database 13 (step 42) checks with the location database 14 for the current location (IP address) of the selected counterparty (step 43) and with the user identity database 11 to ensure the URIs and current locations of both the calling party and the called party are valid (step 44). If these checks are validated, the session admission control processor 12 generates a session initiation attempt 45 to the user terminal 19 corresponding to the current IP address held for the called party. This causes the destination user's terminal 19 to generate an indication 21 that an incoming session attempt is being made. If the called party wishes to accept the session, he activates the corresponding control 22 on his terminal 19 to transmit an authorisation 46 to the session admission control processor 12 which, in turn, transmits an instruction 47 to the session border controller 17 to establish the link (48, 49).

Either party 18, 19 may set up a call to the other, irrespective of which party initially reserved the capacity.

The session admission control processor 12 is arranged such that no VoIP session can be initiated unless the connection capacity has been previously reserved by the control system 16 and its parameters stored in the session parameter database 13. When a customer 18 looks for a destination party 19 on the network the lookup process in the SBC 17 directs the user to the session admission control processor 12, which is configured so that the "voice" class of service can only be accessed this way.

The number of connections available to a customer is regulated by the authorisation server 16 to ensure that the total capacity of all the links available to a user 18 do not exceed the available bandwidth. Users can only provision within this authorised capacity. The entries in the database are policed to ensure that the user 18 setting up the call is using his own calling domain, and the target user 19 is always checked and consulted before the call is allowed.

What is claimed is:

1. A method of creating virtual dedicated connections between parties to a packet-switched system, said method comprising:
    populating a session parameter database with parameters for permitted sessions, and controlling access to a packet-switched call routing system such that, when a session request is set up between a first party and a second party, the session is connected only if specified parameters of the requested session, including identifies of the first party and the second party, have previously been stored in the session parameter database;
    wherein said populating the session parameter database is controlled such that the total capacity required by the permitted sessions whose parameters are stored in the database does not exceed a predetermined value; and
    wherein the capacity required to connect sessions meeting the parameter sets defined in the session parameter database is made available for use by general traffic when not required for sessions meeting the parameter set.

2. A method according to claim 1, wherein said populating the session parameter database is controlled such that the total capacity allocated to sessions connected by any one party is limited, to prevent over-subscription of resources in the packet-switched network.

3. A method according to claim 1, wherein a definition of parameters for permitted sessions for a connection between two parties requires the cooperation of both parties.

4. A method according to claim 1, wherein allowable parameters include the coding process to be used for the session.

5. A method according to claim 1, wherein sessions are controlled such that only one session meeting a given parameter set may be connected at one time.

6. A method according to claim 5, in which a user may establish sessions to two or more other parties at once, each session satisfying a different parameter set.

7. A method according to claim 1, wherein such general traffic is connected only if predetermined parameter are met.

8. A session control system for a packet-switching system, said call control system comprising:
    a session parameter database, a data entry portal for populating the session parameter database with permitted session parameters, including the identifies of permitted combinations of calling party and called party, and
    a session admission control processor for processing session requests received from calling parties, the session admission control processor comprising:
    means for receiving a request from a first party to set up a session to a second party, data retrieval means for cooperating with the session parameter database to identify whether parameters corresponding to the session request have been stored in the session parameter database, and
    session connection means for completing the connection if the specified parameters of the requested session have previously been stored in the session parameter database;
    wherein the session parameter database has capacity-limiting means controllable such that the total capacity required by sessions whose parameters are stored in the session parameter database does not exceed a predetermined value; and
    wherein the capacity required to connect sessions meeting parameter sets defined in the database is made available for use by general traffic when not required for sessions meeting the session parameter set.

9. A session control system according to claim 8, wherein the capacity-limiting means is controllable such that the total capacity allocatable to sessions connected by any one party does not exceed a predetermined value.

10. A session control system according to claim 8, wherein the data entry portal is arranged such that the cooperation of both parties to a session is required for the parameter set of such a session to be entered.

11. A session control system according to claim 8, wherein allowable parameters include the coding process to be used for the session.

12. A session control system according to claim 8, wherein the session admission control processor is controllable such that only one session meeting a given parameter set may be connected at one time.

13. A session control system according to claim 12, wherein the session admission control processor is controllable such that a user may establish sessions to two or more other parties at once, each session satisfying a different parameter set.

14. A session control system according to claim 8, wherein the session admission control processor comprises means for identifying between types of general traffic meeting different parameters and only connecting such traffic if it meets predetermined parameters.

\* \* \* \* \*